United States Patent [19]

Wong

[11] Patent Number: 4,940,774

[45] Date of Patent: Jul. 10, 1990

[54] CARBON MONOXIDE/OLEFIN POLYMERIZATION WITH DILUENT COMPRISING APROTIC SOLVENT AND WATER

[75] Inventor: Pui K. Wong, Katy, Tex.

[73] Assignee: Shell Oil Company, Houston, Tex.

[21] Appl. No.: 394,688

[22] Filed: Aug. 16, 1989

[30] Foreign Application Priority Data

Sep. 29, 1988 [NL] Netherlands ............... 8802391

[51] Int. Cl.$^5$ .............................. C08G 67/02
[52] U.S. Cl. ........................................ 528/392
[58] Field of Search ............................ 528/392

[56] References Cited

U.S. PATENT DOCUMENTS 3,694,412 9/1972 Nozaki ..................... 260/63 CQ

FOREIGN PATENT DOCUMENTS 121965 10/1984 European Pat. Off. .
181014 5/1986 European Pat. Off. .
213671 3/1987 European Pat. Off. .
257663 3/1988 European Pat. Off. .

Primary Examiner—Harold D. Anderson

[57] ABSTRACT

An improved process for the production of linear alternating polymer of carbon monoxide and at least one ethylenically unsaturated hydrocarbon comprises the use as reaction diluent of a mixture of an aprotic diluent and water.

9 Claims, No Drawings

CARBON MONOXIDE/OLEFIN POLYMERIZATION WITH DILUENT COMPRISING APROTIC SOLVENT AND WATER

FIELD OF THE INVENTION

The present invention relates to a process for the production of linear alternating polymer of carbon monoxide and at least one ethylenically unsaturated hydrocarbon. More particularly, the invention relates to an improved process which employs, as reaction diluent, a mixture of an aprotic reaction diluent and water.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of trialkylphosphine complexes of palladium compounds as catalyst. Nozaki extended the process to produce linear alternating polymers in the presence of triarylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. These polymers, now becoming known as polyketones or polyketone polymers, are produced according to more recent processes which are illustrated by a number of published European Patent Application Nos. including 121,965, 181,014, 213,671 and 257,663. The process typically involves contacting the monomeric reactants under polymerization conditions in the presence of an alkanolic reaction diluent and a catalyst composition formed from a compound of a Group VIII metal selected from palladium, cobalt or nickel, the anion of a strong non-hydrohalogenic acid and a bidentate ligand of phosphorus, arsenic or antimony. The resulting polymers are relatively high molecular weight materials having established utility in the production of shaped articles such as containers for food and drink by procedures which are conventional for the processing of thermoplastic polymers.

In the process of producing the polymers, the choice of catalyst composition precursors is of considerable importance in determining the activity of the catalyst composition which results but the choice of reaction diluent is also of significance. The polymerization process is suitably conducted in aprotic reaction as illustrated by copending U.S. patent application Ser. No. 271,130, filed Nov. 14, 1988, now U.S. Pat. No. 4,921,938, reaction rate is often rather low in aprotic diluents. The most frequent diluents of choice are protic diluents such as alkanols and particularly preferred is methanol, in part because of the more rapid reaction rate obtainable by the use of such diluents. The use of a methanol/water mixture as reaction diluent is shown by copending U.S. patent application Ser. No. 213,731 filed June 30, 1988, now U.S. Pat. No. 4,889,914 methanol reaction diluent did not substantially effect the polymerization rate. It would be of advantage to provide additional polymerization diluents which provide generally high rates of polymerization.

SUMMARY OF THE INVENTION

The present invention provides an improved process for the production of carbon monoxide and at least one ethylenically unsaturated hydrocarbon. More particularly, the invention provides a process for the production of such polymers under polymerization conditions in the presence of a catalyst composition and a reaction diluent comprising a mixture of at least partially water-miscible aprotic diluent and water.

DESCRIPTION OF THE INVENTION

The polyketone polymers which are produced by the process of the invention are linear alternating polymers of carbon monoxide and at least one ethylenically unsaturated hydrocarbon and contain substantially one molecule of carbon monoxide for each molecule of hydrocarbon. The ethylenically unsaturated hydrocarbons which are suitable for use as precursor of the polyketone polymers have up to 20 carbon atoms inclusive, preferably up to 10 carbon atoms inclusive, and are aliphatic including ethylene and other alpha-olefins such as propylene, 1-butene, isobutylene, 1-hexene, 1-octene and 1-dodecane, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly on alpha-olefin such as Propylene.

When the preferred terpolymers of carbon monoxide, ethylene and second hydrocarbon are produced by the process of the invention, there will be at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula

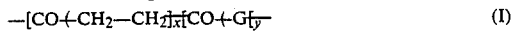
$$-[CO+CH_2-CH_2]_x[CO+G]_y- \qquad (I)$$

wherein G is a moiety of an ethylenically unsaturated hydrocarbon of at least 3 carbon atoms polymerized through the ethylene unsaturation. The $-CO+CH_2CH_2+$ units and units are found randomly $-CO+G+$ throughout the polymer chain when $-CO+G+$ units are present and the ratio of y:x is more than about 0.5. In the embodiment of the process of the invention where copolymers of the invention are produced without the presence of second hydrocarbon, the polymers are represented by the above formula I wherein y is zero. When y is other than zero, i.e., terpolymers are produced, the preferred ratio of y:x is from about 0.01 to about 0.1. The end groups or "caps" of the polymer chain will depend upon what groups are present during the production of the polymer and whether and how the polymers are purified. The precise properties of the polymer do not appear to depend upon the particular end groups to any considerable extent so that the polymers are fairly represented by the formula for the polymeric chain as depicted above.

Of particular interest are the polyketone polymers of number average molecular weight from about 1000 to about 200,000, particularly those polymers of number average molecular weight from about 20,000 to about 90,000 as determined by gel permeation chromatography. The physical properties of the polymers will depend in part on the molecular weight, whether the polymer is a copolymer or a terpolymer and, in the case of terpolymers, the nature of and the proportion of the second ethylenically unsaturated hydrocarbon present. Typical melting points of the polyketone polymers are 'rom about 175° C. to about 300° C., particularly from about 210° C. to about 270° C. The polymers will have a limiting viscosity number (LVN), measured in a standard capillary viscosity measuring device in m-cresol at 60° C., of from about 0.4 dl/g to about 10 dl/g hut preferably from about 0.8 dl/g to about 4 dl/g.

The broad, general method of producing polyketone polymers which is now becoming conventional is illustrated by the above published European Patent Applications. The carbon monoxide and ethylenically unsaturated hydrocarbon(s) are contacted under polymerization conditions in the presence of a reaction diluent in which the polymer product is substantially insoluble and a catalyst composition formed from a palladium compound, an anion of a non-hydrohalogenic acid having a pKa (measured in water at 18° C.) below about 6 and preferably below 2, and a bidentate ligand of phosphorus. The palladium compound is preferably a palladium carboxylate and palladium compounds such as palladium acetate, palladium propionate, palladium hexanoate and palladium octanoate are suitable. Palladium acetate is a particularly preferred palladium compound. The anion precursor of the catalyst composition is suitably the anion of an inorganic acid such as sulfuric acid or perchloric acid or an organic acid including carboxylic acids such as trichloroacetic acid, dichloroacetic acid and trifluoroacetic acid as well as sulfonic acids such as p-toluene-sulfonic acid, methanesulfonic acid and trifluoromethanesulfonic acid. Trifluoroacetic acid and p-toluenesulfonic acid comprise a preferred class of acids from which the anion precursor of the catalyst composition is obtained. The anion is preferably provided as the free acid hut is also usefully provided as a metal salt of the acid, particularly as a non-noble transition metal salt. The anion and the palladium are also usefully provided on occasion as a single compound, e.g., palladium trifluoroacetate.

The bidentate ligand of phosphorus is preferably a ligand of the formula

(II)

wherein R independently is aromatic of up to 10 carbon atoms and R' is a divalent linking group of up to 10 carbon atoms with from 2 to 4 atoms inclusive in the bridge. R is hydrocarbyl aromatic containing only atoms of carbon and hydrogen, e.g., phenyl, naphthyl, tolyl or xylyl, or R is non-hydrocarbyl aromatic containing additional atoms which are preferably present in polar substituents, preferably alkoxy, or aromatic ring carbon atoms, at least one of which is substituted on a carbon atom ortho to the carbon through which R is connected to the phosphorus. Illustrative of preferred non-hydrocarbyl R groups are 2-methoxyphenyl, 2-ethoxyphenyl, 2-4-dimethoxyphenyl, 2-methoxy-6-isopropoxyphenyl and 2,4,6-trimethoxyphenyl. The R' group is preferably hydrocarbyl and is of the formula $-(CH_2)_n-$ wherein n is an integer from 2 to 4 inclusive. Most preferred as the R' group is the 1,3-propylene or trimethylene group and preferred bidentate ligands of phosphorus are 1,3-bis(diphenylphosphino)propane and 1,3-bis[di(2-methoxyphenyl)phosphino]propane.

It is useful on occasion in order to enhance the activity of the catalyst to include in the catalyst composition solution an organic oxidant. Quinones are suitable for this purpose, e.g., benzoquinone or naphthoquinone. The 1,4-quinones are particularly useful, especially 1,4-benzoquinone. As stated, the presence of an organic oxidant is not required, but amounts of quinone up to about 5000 mol per mol of palladium compound are suitable.

The polymerization is conducted by contacting the monomeric reactants and the catalyst composition precursors under polymerization conditions in the presence of a reaction diluent. The quantity of anion to be employed in the formation of the catalyst composition is from about 0.5 mol to about 50 moles per mol of palladium but amounts from about 1 mol to about 25 mols per mol of palladium are preferred. The bidentate phosphorus ligand should be provided in an amount of from about 0.5 mol to about 2 mols, preferably from about 0.75 mol to about 1.5 mol per mol of palladium. The molar ratio of carbon monoxide to total unsaturated hydrocarbon should be from about 5:1 to about 1:10 but preferably is from about 2:1 to about 1:5. Sufficient catalyst should be employed to provide from about $1 \times 10^{-7}$ mol to about $1 \times 10^{-3}$ mol of palladium per mol of unsaturated hydrocarbon to be polymerized. Amounts of catalyst sufficient to provide from about $1 \times 10^{-6}$ mol to about $1 \times 10^{-4}$ mol of palladium per mol of unsaturated hydrocarbon are preferred.

Typical polymerization conditions include a reaction temperature from about 40° C. to about 120° C. but temperatures from about 50° C. to about 100° C. are more frequently employed. The reaction pressure is suitably from about 20 bar to about 150 bar, but more often from about 30 bar to about 100 bar.

The contacting of the monomeric reactants and the catalyst composition takes place in a reaction diluent in which the polymeric product is substantially insoluble. The reaction diluents of the invention are miscible mixtures of aprotic diluents and water and provide reaction rates which approach, equal or even exceed the reaction rates of the more traditional protic reaction diluents such as the more conventional methanol diluent. The aprotic diluents which are usefully employed with water in the process of the invention are at least partially miscible with water, i.e., miscible in the proportions employed in the process of the invention. Such aprotic materials include aliphatic ketones such as acetone and methyl ethyl ketone, aliphatic carboxylic acid esters such as methyl acetate, ethyl acetate and methyl propionate, ethers including acyclic ethers such as diethylene glycol dimethyl ether as well as cyclic ethers such as dioxane and tetrahydrofuran, lactones such as butyrolactone and lactams such as N-methyl-2-pyrrolidone and cyclic sulfones such as sulfolane. The use of tetrahydrofuran as the aprotic diluent is preferred. The proportion of water to be employed in conjunction with the aprotic diluent is from about 1% by volume to about 50% by volume, based on total mixture depending in part on the extent to which the reaction diluent components are miscible. Mixtures containing from about 1% water by volume to about 25% water by volume on the same basis are preferred and particularly preferred are mixtures containing from about 5% water by volume to about 15% by volume of water.

The contacting of the monomeric reactants, catalyst composition and reaction diluent is conducted in a suitable reactor by conventional methods such as refluxing, shaking or stirring. Subsequent to polymerization the reaction is terminated as by cooling the reactor and contents and releasing the pressure. The polymer product is recovered by well known procedures such as filtration or decantation. The polymer is used as recovered or is purified as by contact with a solvent or extraction agent which is selective for catalyst residues.

The polyketone polymer is a thermoplastic polymer and is employed in applications conventional for thermoplastics including the production of films, fibers, sheets and shaped articles which are produced by known methods such as extrusion, injection molding and thermo-forming. The polymers are particularly useful as engineering polymer because of the relatively high melting points and mechanical properties such as strength.

The invention is further illustrated by the following Comparative Examples (not of the invention) and the Illustrative Embodiments which should not be construed as limiting. In all cases, the polymer product was examined by $^{13}$C-NMR and found to be of the repeating unit $-CO-(CH_2-CH_2)-$

COMPARATIVE EXAMPLE I

A linear alternating copolymer of carbon monoxide and ethylene was produced by charging 200 ml of methanol to an autoclave of 300 ml capacity equipped with a mechanical stirrer. The contents of the autoclave were heated to 90° C. and an equimolar mixture of carbon monoxide and ethylene was added until a pressure of 55 bar was reached. A catalyst composition solution was then added which was formed from 30 ml methanol, 5 ml methyl ethyl ketone, 0.019 mmol palladium acetate, 0.038 mmol p-toluenesulfonic acid and 0.019 mmol 1,3-bis[di(2-methoxyphenyl)phosphino]propane. During the resulting polymerization the pressure was maintained by addition of the equimolar carbon monoxide/ethylene mixture. After 3.07 hours, the polymerization was terminated by cooling the reactor and contents to room temperature and releasing the pressure.

The copolymer product was recovered from the product mixture by filtration, washed with methanol and dried at 70° C. The yield of copolymer was 23.5 g, produced at a rate of 2.9 kg Polymer/g Pd hr.

COMPARATIVE EXAMPLE II

A linear alternating copolymer of carbon monoxide and ethylene was produced by a procedure substantially similar to that of Comparative Example I, except that
 (a) 200 ml of tetrahydrofuran was charged to the autoclave instead of methanol,
 (b) the catalyst composition solution was formed from 31 ml tetrahydrofuran, 0.01 mmol palladium acetate, 0.022 mmol p-toluenesulfonic acid and 0.012 mmol of 1,3-bis[di(2-methoxyphenyl)phosphino]propane,
 (c) the polymer product was washed with tetrahydrofuran instead of methanol, and
 (d) the reaction time was 19.2 hours.

The yield of copolymer was 4.54 g, produced at a rate of 0.22 kg polymer/g Pd hr.

COMPARATIVE EXAMPLE III

A linear alternating copolymer of carbon monoxide and ethylene was produced by a procedure substantially similar to that of Comparative Example II, except that an equal volume of acetone was used instead of tetrahydrofuran, and the reaction time was 4.67 hours. The yield of copolymer was 6.45 g, produced at a rate of 1.3 kg polymer/g Pd hr.

ILLUSTRATIVE EMBODIMENT I

A linear alternating copolymer of carbon monoxide and ethylene was produced by a procedure substantially similar to that of Comparative Example I except that
 (a) 200 ml of tetrahydrofuran and 5 ml of water were charged to the autoclave instead of methanol,
 (b) the catalyst composition solution was formed from 46 ml tetrahydrofuran, 0.01 mmol palladium acetate, 0.222 mmol p-toluene-sulfonic acid, and 0.012 mmol 1,3-[di(2-methoxyphenyl)phosphino]propane,
 (c) the reaction time was 18.97 hours and
 (d) the copolymer product was washed with tetrahydrofuran.

The yield of copolymer was 16.5 g, produced at a rate of 0.82 kg of polymer/g Pd hr

ILLUSTRATIVE EMBODIMENT II

A linear alternating copolymer of carbon monoxide and ethylene was produced by a procedure substantially similar to that of Illustrative Embodiment I, except that the diluent mixture charged to the autoclave was 200 ml of tetrahydrofuran and 10 ml of water, and the reaction time was 3.53 hours. The yield of copolymer was 12.3 g, produced at a rate of 3.3 kg of copolymer/g Pd hr.

ILLUSTRATIVE EMBODIMENT III

A linear alternating copolymer of carbon monoxide and ethylene was produced by a procedure substantially similar to that of Illustrative Embodiment I except that
 (a) 177 ml of tetrahydrofuran and 23 ml of water were initially charged to the autoclave,
 (b) the catalyst composition solution was formed from 30 ml tetrahydrofuran, 0.01 mmol palladium acetate, 0.024 mmol p-toluenesulfonic acid and 0.012 mmol 1,3-bis[di(2-methoxyphenyl)phosphino]propane, and
 (c) the reaction time was 4.57 hours.

The yield of copolymer was 23.07 g, produced at a rate of 4.7 kg of copolymer/g Pd hr.

ILLUSTRATIVE EMBODIMENT IV

A linear alternating copolymer of carbon monoxide and ethylene was produced by a procedure substantially similar to Illustrative Embodiment III except that the diluent mixture initially charged to the autoclave was 85 ml of tetrahydrofuran and 115 ml water, and the reaction time was 19.42 hours. The yield of copolymer was 23.97 g, produced at a rate of 1.2 kg of copolymer/g Pd hr.

ILLUSTRATIVE EMBODIMENT V

A linear alternating copolymer of carbon monoxide and ethylene was produced by a procedure substantially similar to that of Illustrative Embodiment IV except that the diluent mixture initially charged to the autoclave was 177 ml of acetone and 23 ml of water, the catalyst composition solution had 30 ml of acetone instead of tetrahydrofuran, the reaction time was 3.23 hours and the product was washed with acetone instead of tetrahydrofuran.

The yield of copolymer was 9.97 g, produced at a rate of 2.9 kg of copolymer r/g Pd hr.

Similar results will be obtained in the production of a terpolymer of carbon monoxide, ethylene and propylene.

What is claimed is:

1. In the process for producing a linear alternating polymer of carbon monoxide and at least one ethylenically unsaturated hydrocarbon by contacting the carbon monoxide and unsaturated hydrocarbon by contacting the carbon monoxide and unsaturated hydrocarbon under polymerization conditions in the presence of a reaction diluent and a catalyst composition formed from a palladium compound, the anion of a nonhydrohalogenic acid having a pKa below 6 and a bidentate ligand of phosphorus, the improvement of employing as the reaction diluent a miscible mixture of an aprotic diluent and water.

2. The process of claim 1 wherein the water of the reaction diluent is present in an amount from about 1% by volume to about 50% by volume based on total mixture.

3. The process of claim 2 wherein the aprotic diluent is acetone or tetrahydrofuran.

4. The process of claim 3 wherein the water is present in an amount from about 1% by volume to about 25% by volume based on total mixture.

5. The process of claim 4 wherein the aprotic diluent is tetrahydrofuran.

6. In the process of producing a linear alternating copolymer of carbon monoxide and ethylene by contacting the carbon monoxide and ethylene under polymerization conditions in the presence of a reaction diluent and a catalyst composition formed from palladium acetate, the anion of trifluoroacetic acid or p-toluenesulfonic acid and 1,3-bis(diphenyl)phenyl)phosphino]propane or 1,3-bis[di(2-methoxyphenyl)phosphino]propane, the improvement of employing as the reaction diluent a miscible mixture of an aprotic diluent and from about 1% by volume to about 25% by volume of water, based on total mixture.

7. The process of claim 6 wherein the aprotic diluent is tetrahydrofuran or acetone.

8. The process of claim 7 wherein the aprotic reaction diluent is tetrahydrofuran.

9. In the process of producing a linear alternating terpolymer of carbon monoxide, ethylene and propylene by contacting the carbon monoxide, ethylene and propylene under polymerization conditions in the presence of a reaction diluent and a catalyst composition formed from palladium acetate, the anion of trifluoroacetic acid or p-toluenesulfonic acid and 1,3-bis(diphenylphosphinopropane or 1,3-bis[di(2-methoxyphenyl)-propane, the improvement of employing as the reaction diluent a miscible mixture of aprotic reaction diluent and from about 1% by volume to about 25% by volume, based on total mixture, of water.

\* \* \* \* \*